United States Patent
Jacquin et al.

(10) Patent No.: US 10,242,195 B2
(45) Date of Patent: Mar. 26, 2019

(54) INTEGRITY VALUES FOR BEGINNING BOOTING INSTRUCTIONS

(71) Applicant: Hewlett Packard Enterprise Development LP, Houston, TX (US)

(72) Inventors: Ludovic Emmanuel Paul Noel Jacquin, Bristol (GB); Thomas M. Laffey, Roseville, CA (US); Adrian Shaw, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 269 days.

(21) Appl. No.: 15/217,583

(22) Filed: Jul. 22, 2016

(65) Prior Publication Data

US 2018/0025159 A1 Jan. 25, 2018

(51) Int. Cl.
*H04L 9/32* (2006.01)
*G06F 21/57* (2013.01)

(52) U.S. Cl.
CPC .......... *G06F 21/575* (2013.01); *H04L 9/3226* (2013.01); *G06F 2221/033* (2013.01)

(58) Field of Classification Search
CPC .............................. G06F 21/575; H04L 9/3226
USPC ....................................................... 713/187
See application file for complete search history.

(56) References Cited

U.S. PATENT DOCUMENTS

| | | | |
|---|---|---|---|
| 6,988,250 B1 | 1/2006 | Proudler et al. | |
| 7,467,370 B2 | 12/2008 | Proudler et al. | |
| 7,725,703 B2* | 5/2010 | Hunter | G06F 21/575 380/259 |
| 2003/0074548 A1* | 4/2003 | Cromer | G06F 21/575 713/1 |
| 2005/0138409 A1* | 6/2005 | Sheriff | G06F 21/572 726/26 |
| 2005/0283601 A1 | 12/2005 | Tahan | |
| 2009/0222653 A1* | 9/2009 | Findeisen | G06F 21/575 713/2 |
| 2010/0088499 A1 | 4/2010 | Zimmer et al. | |
| 2011/0131447 A1 | 6/2011 | Prakash et al. | |
| 2012/0017071 A1* | 1/2012 | Shahar | G06F 9/4401 713/2 |
| 2015/0149751 A1 | 5/2015 | Nemiroff et al. | |

* cited by examiner

*Primary Examiner* — Michael S McNally
(74) *Attorney, Agent, or Firm* — Hewlett Packard Enterprise Patent Department

(57) ABSTRACT

Examples described herein include a computing device with a processing resource to execute beginning booting instructions of the computing device. The beginning booting instructions may include a first booting instruction. The computing device also includes an access line to access the first booting instruction, a measuring engine to duplicate the first booting instruction and to generate a first integrity value associated with the first booting instruction, and a measurement register to store the first integrity value. The measuring engine may be operationally screened from the processing resource and the measurement register may be inaccessible to the processing resource.

16 Claims, 6 Drawing Sheets

INTEGRITY VALUES FOR BEGINNING BOOTING INSTRUCTIONS

BACKGROUND

A computing device may have machine-readable instructions on the device that help mandate the role the computing device plays. These instructions may be vulnerable to security attacks.

BRIEF DESCRIPTION OF THE DRAWINGS

The following detailed description references the drawings, wherein.

DETAILED DESCRIPTION

Figure 1:
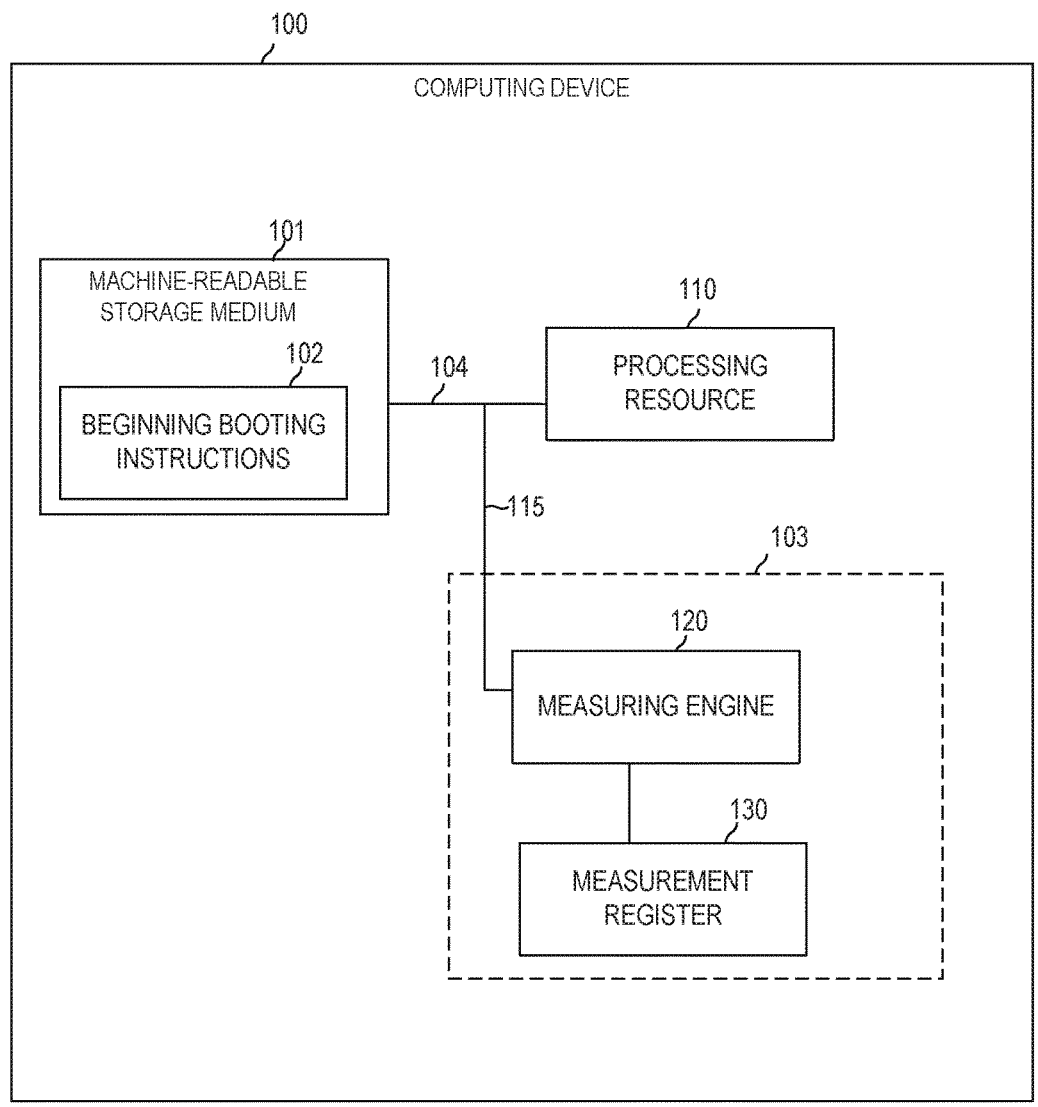
FIG. 1 is a block diagram of a computing device to generate an integrity value of beginning booting instructions from an input and output lane, according to some examples.

The machine-readable instructions on a computing device may include booting code (machine-readable instructions that execute upon the powering or booting of the device) with multiple components. Upon powering (booting) of the computing device, the booting code may be executed to bring the computing device to an operating state.

In some situations, the booting code is divided into separate portions, which may include the initial boot loader (IBL), the extended boot loader, and the operating system (OS) portion. These portions may be vulnerable to security attacks. One way for a computing device to protect against potential security attacks is by executing these portions in a certain order and using earlier portions to verify the security or integrity of later portions.

For example, the initial boot loader (IBL) may be the first portion of the booting code that is executed. Because it is the first portion that is executed, it is referred to as the core root of trust. The IBL then verifies the security of the later portions. For example, the IBL may verify the security of a later portion (e.g., the extended boot loader) by validating a digital signature of the later portion. The IBL may also determine an integrity value representing the later portion. The integrity value may be used by the computing device or a remote device to verify that the later portion executed correctly. In other words, the IBL is the initial code that is executed to verify the security of the later portions.

In some situations, however, the IBL itself may be corrupt and cannot be trusted. Because the computing device relies on the IBL, a corrupt IBL is difficult for the computing device to identify and leads to a breakdown in the security verification process. For example, an IBL that is corrupt may report expected integrity values instead of actual integrity values of a later portion. This may lead to a determination (e.g. by a remote verifying computing device) that later portion of the booting code on the computing device were executed in the manner expected, when, in actuality, the later portions were not executed properly. Additionally, an IBL that is corrupt may validate signatures on later portions of the booting code that should not be validated (e.g. signatures from unauthorized entities).

Examples discussed herein address these technological issues by providing a computing device with an ability to measure beginning booting instructions of the computing device (e.g., the IBL). The measurement is done independently from the execution of the instructions. Examples discussed herein allow for storage of the measurement in a register that is inaccessible to the processing resource of the computing device. Additionally, examples discussed herein allows for the stored measurement to be sent to a verifying computing device (e.g., for verification) through a communication interface that is controlled by the verifying computing device. Thus, examples discussed herein allow for the security of beginning booting instructions to be verified independently of the execution of the beginning booting instructions on the computing device.

In some examples, a computing device comprises a processing resource, an access line, a measuring engine, and a measurement register. The processing resource is to execute beginning booting instructions of the computing device. In some examples, the beginning booting instructions comprises a first booting instruction. The access line is to access the first booting instruction. The measuring engine is to duplicate the first booting instruction and to generate a first integrity value associated with the first booting instruction. The measurement register is to store the first integrity value. The measuring engine is operationally screened from the processing resource and the measurement register is inaccessible to the processing resource.

In some examples, a method includes duplicating, with a hardware-based measuring logic component, beginning booting instructions of a computing device. In some examples, the beginning booting instructions comprise a number of individual instructions. The method also includes generating, with the hardware-based measuring logic component, a cryptographic integrity value associated with the beginning booting instructions, storing the cryptographic integrity value, and sending the cryptographic integrity value to a host computing device. In some examples, the cryptographic integrity value is stored in a measurement register and the cryptographic integrity value is sent over a communication interface.

In some examples, a slave computing device comprises a processing resource, an access line, a measuring engine, a measurement register, and a communication interface. The processing resource is to execute beginning booting instructions of the slave computing device. In some examples, the beginning booting instructions comprises a number of individual instructions. The access line is to access the beginning booting instructions. The measuring engine is to duplicate the beginning booting instructions and to generate a cryptographic integrity value associated with the beginning booting instructions. The measuring engine is operationally screened from the processing resource. The measurement register is to store the cryptographic integrity value. The communication interface is to link the measurement register directly to a master computing device. In some examples, the communication interface is controlled by the master computing device.

Referring now to the figures, FIG. 1 is a block diagram of a computing device 100 to generate an integrity value of beginning booting instructions. As used herein, a "computing device" may be a server (e.g. a blade server), computer networking device (e.g., a switch), chip set, desktop computer, workstation, personal device, point of sale (PoS) device, etc., or any other processing device or equipment.

Computing device 100 includes a processing resource 110 and machine-readable storage medium 101. Machine-readable storage medium 101 may be in the form of non-transitory machine-readable storage medium, such as suitable electronic, magnetic, optical, or other physical storage apparatus to contain or store information such as instructions 102, related data, and the like.

As used herein, "machine-readable storage medium" may include a storage drive (e.g., a hard drive), flash memory, any type of storage disc (e.g., a Compact Disc Read Only Memory (CD-ROM), any other type of compact disc, a DVD, etc.) and the like, or a combination thereof. In some examples, machine-readable storage medium may correspond to a secondary memory. The secondary memory can, for example, include a nonvolatile memory where a copy of software or other data is stored. While machine-readable storage medium 101 is shown in the example of FIG. 1 as being housed in computing device 100, in other examples, machine-readable storage medium 101 may be separate from computing device and accessible to processing resource 110 of computing device 100.

In the example of FIG. 1, instructions 102 are stored (e.g., encoded) on storage medium 101 and are executable by processing resource 110. Processing resource 110 may, for example, be in the form of a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 102, and other instructions that are not shown in FIG. 1.

As understood herein, "beginning booting instructions" include any instruction stored in the portion of machine-readable storage medium 101 that is configured to be accessed first by computing device 100 after computing device 100 is turned on (booted). Accordingly, beginning booting instructions may include any instruction that is executable to verify that other instructions stored on machine-readable storage medium 101 (or other machine-readable storage medium accessible to processing resource 110) are not corrupt, forming an initial state of trust for computing device 100. Thus, "beginning booting instructions" may be characterized as the core root of trust or the initial boot loader for the software stack on computing device 100. Beginning booting instructions may include at least the core root of trust (e.g., the initial boot loader, the extended boot loader in addition to the initial boot loader, etc.). In some examples, beginning booting instructions does not include instructions directed towards an operating system of computing device 100. In examples where computing device 100 is a personal computer, beginning booting instructions may refer to the basic input/output system (BIOS).

Figure 2:
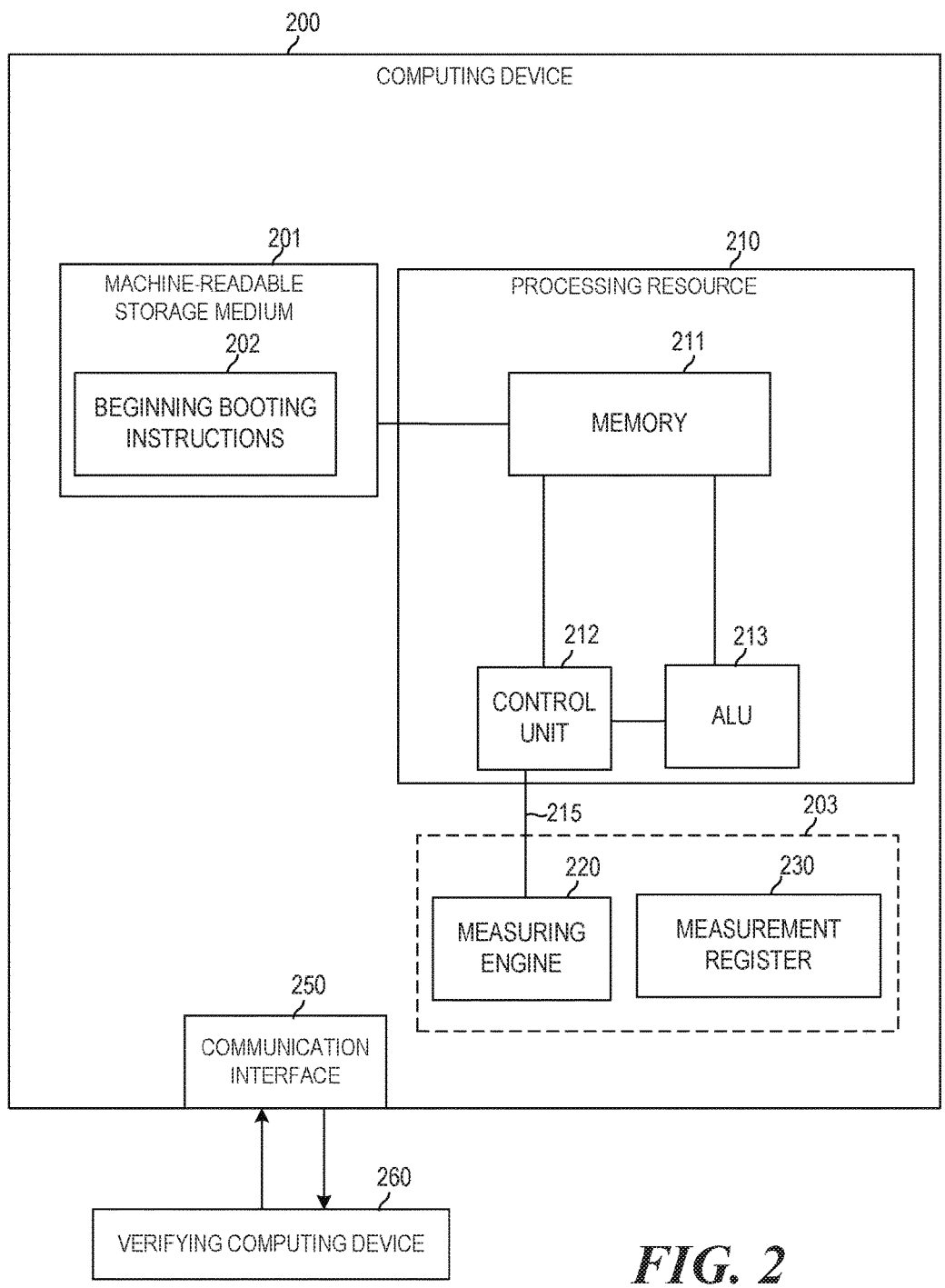
FIG. 2 is a block diagram of a computing device to generate an integrity value of fetched beginning booting instructions, according to some examples.

Access line 115 may be a physical electronic component that allows measuring engine 120 to access beginning booting instructions 102. In some examples, and in the example shown in FIG. 1, access line 115 is connected to an input and output lane 104 of computing device 100. Input and output lane 104 connects processing resource 110 to machine readable storage medium 101. In other examples, access line 115 may be connected directly to processing resource 110 to access to beginning booting instructions 102. For example, as shown in FIG. 2, access line 115 may be connected to a control unit of processing resource 110.

Referring back to FIG. 1, measuring engine 120 is an engine of computing device 100 that includes hardware-based logic components that allows computing device 100 to duplicate the beginning booting instructions 102 read by processing resource 110 and to generate an integrity value to reflect the beginning booting instructions 102.

As understood herein, "hardware-based logic component" relies on dedicated hardware (e.g., integrated circuit (IC), other control logic, other electronic circuits, or suitable combinations thereof that include a number of electronic components) to perform a particular action and/or function, as opposed to machine executable instructions (e.g., software, firmware, etc.) that is stored in memory and executable by a processor. In other words, measuring engine 120 has dedicated, interconnected logic elements that process signals and data as opposed to retrieving and executing instructions from a storage medium. In some examples, measuring engine 120 may be implemented by an application specific integrated circuit (ASIC).

In some examples, beginning booting instructions 102 may include a plurality of individual booting instructions, including a first booting instruction. Thus, the hardware-based logic components included in measuring engine 120 allow measuring engine 120 to duplicate the first instruction of the beginning booting instructions 102. The hardware-based logic components also allow measuring engine 120 to generate an integrity value associated with the first instruction.

As used herein, an "integrity value" includes a numeric value that characterizes a specific set of data. Accordingly, an integrity value that is associated with the first instruction of the beginning booting instructions may characterize the first instruction. In some examples, an integrity value for a specific data set may be unique to the specific data set (e.g., a first data set has a different integrity value than a second data set) such that the integrity value may be used to identify the specific data set. For example, an integrity value that is associated with the first instruction of beginning booting instructions 102 may be used to identify the first instruction of beginning booting instructions 102.

In some examples, the integrity value is generated through a cryptographic hash function and thus may be characterized as a cryptographic integrity value. A cryptographic hash function may map a data set or arbitrary size to a data of fixed size. Some non-limiting examples of a cryptographic hash function include those of the Secure Hash Algorithm (SHA) family (e.g., SHA-1, SHA-256, SHA-512, SHA-3, etc.), MD5, etc. While various cryptographic hash functions may be used, in some examples, the cryptographic hash function may be a function with high collision resistance to ensure a unique value for a specific data set. Accordingly, measuring engine 120 includes hardware-based logic components allowing computing device to generate an integrity value (e.g., a cryptographic hash value) for an instruction in the beginning booting instructions 102.

In some examples, beginning booting instructions 102 may include a plurality of individual booting instructions, including a first booting instruction, a second booting instruction, etc., up to a total number of individual booting instructions. Although beginning booting instructions 102 may include a total number of individual instructions that is stored in machine-readable storage medium 101, a number of individual instructions executed by processing resource 110 may be different than the total number of instructions. This may occur, for example, in examples where computing device 100 does not boot as intended by a manufacturer of computing device 100.

As discussed above, access line 115 may allow measuring engine 120 access to everything that is relayed to processing resource 110 by input and output lane 104. Thus, measuring engine 120 accesses the same number of individual instructions of beginning booting instructions that is accessed by processing resource 110. Accordingly, this may not be the total number of individual in beginning booting instructions 102 (for example, in situations where computing device 100 does not boot as intended).

For example, beginning booting instructions may include a total number of 10 individual booting instructions, including a first booting instruction and a second booting instruction. A first booting instruction of beginning booting instructions 102 may be read by processing resource 110 through input and output lane 104. Through access line 115, measuring engine 120 may duplicate the first booting instruction of beginning booting instructions 102, allowing measuring engine 120 to generate a first integrity value reflecting the first booting instruction of beginning booting instruction. This is done without interrupting the processing of first instruction by processing resource 110.

Similarly, a second booting instruction of beginning booting instructions 102 may be read by processing resource 110 through input and output lane 104. Through access line 115, measuring engine 120 may also duplicate the second booting instruction of beginning booting instructions 102. After the second booting instruction is read, the processing resource stops processing beginning booting instructions.

In this example, the processing resource 110 reads two individual instructions. The remaining eight instructions, while present in the beginning booting instructions 102, are not read by processing resource 110. Accordingly, measuring engine 120 duplicates the same number of individuals instructions read by processing resource 110 (two), and does not duplicate the remaining individual instructions (eight) that are not read by processing resource 110. The specific total number of instructions on beginning booting instructions and specific number of instructions read by processing resource 110 described in relation to this example are for explanation purposes. Examples described herein are not restricted to these specific numbers.

Measurement register 130 is a storage medium of computing device 100 that allows computing device 100 to temporarily store the integrity value generated by measuring engine 120. In some examples, measurement register 130 is a small, fast storage location that is easily writeable by measuring engine 120. In some examples, measurement register 130 may be implemented by an ASIC as described above in relation to measuring engine 120.

In some examples, measurement register 130 is inaccessible to processing resource 110. As understood herein, "inaccessible" includes at least that the processing resource 110 cannot modify (write to) the measurement register 130.

Accordingly, in some examples, processing resource 110 cannot write to the measurement register 130 but can read the measurement register 130. This may affect how the stored integrity value is verified. For example, a computing device in which the measurement register 130 can be read by processing resource 110 may use the processing resource 110 in sending the stored integrity value for verification.

An example of this is when an in-band communication interface is used to relay the integrity value stored in measurement register 130 to another computing device (e.g., a verifying computing device or a host computing device), as discussed herein.

In other examples, processing resource 110 cannot write to the measurement register 130 and additionally cannot read what is stored on the measurement register 130. This may also affect how the stored integrity value is verified. For example, a computing device in which the measurement register cannot be read by processing resource 110 relies on a communication interface that does not require involvement of the processing resource 110. An example of this is described in relation to communication interface 450 in FIG. 4. In some examples, a measurement register that cannot be written to and read by the processing resource 110 provides heightened security as compared to a measurement register that cannot be written to but may be read by the processing resource 110.

As discussed above, computing device 100 may include additional processing resources other than processing resource 110. Additionally computing device 100 may include other hardware-based logic components that process signals and data. In those examples, measurement register 130 may be inaccessible to those additional hardware-based logic components and processing resources. The inaccessibility of processing resource 110 (and/or additional processing resources or hardware-based logic components) to measurement register 130 may allow reliance on the integrity value stored on the measurement register 130 as a value that has not been corrupted since originally generated and written by measuring engine 120.

As discussed above, beginning booting instructions 102 may include a second booting instruction that processing resource 110 reads. In some examples, measuring engine 120 may allow computing device 130 to duplicate second booting instruction of beginning booting instructions 101 and to update the integrity value stored in measurement register 130 to reflect the second booting instruction. For example, a first integrity value generated for first instruction may be ABC. Measurement engine 120 may determine that a second integrity value associated with second instruction is XYZ and may update the stored first integrity value (ABC) with the second integrity value (XYZ), such that the updated integrity value reflects the second booting instruction and the first booting instruction (ABCXYZ). These integrity values are provided for explanation purposes only and not restrictive. Thus, in some examples, this updated integrity value may be characterized as the running integrity value (e.g., a running hash value). This running integrity value may be stored in measurement register 130. In some examples, measurement register 130 is erased when processing resource 110 is reset or computing device 100 re-boots.

In some examples, computing device 100 may include a count register that allows computing device 100 to keep track of a number of times an integrity value is generated by measuring engine 120. In some examples, the number times an integrity value is generated correlates to the number of individual instructions of beginning booting instructions that are read by processing resource 110. This is discussed in relation to FIG. 3.

In some examples, processing resource 110 may execute instructions that are outside of beginning booting instructions 102 (e.g., instructions for an extended boot loader, instructions for an operating system, etc.) after it executes beginning booting instructions 102. In examples where access line 115 is connected to input and output lane 104, measuring engine 120 may duplicate everything relayed in input and output lane and generate an integrity value for everything that is duplicated. Measuring engine 120 may do that in situations where input and output lane 104 is dedicated to beginning booting instructions 102. This structure limits the instructions relayed over input and output lane 104 to instructions in beginning booting instructions 102 and allows the integrity value stored in measurement register 130 to be associated with beginning booting instructions 102.

In some examples, input and output lane 104 is not dedicated to beginning booting instructions 102. For example, other instructions may be stored on machine-readable storage medium 101 and thus may be relayed by input and output lane 104 to processing resource 110. In these examples, measuring engine 120 may determine an end of beginning booting instructions 102 that is executed by processing resource 110. This allows measuring engine 120 to know when to stop duplicating the instructions from the access line 115 and to stop generating an integrity value associated with the duplicated instruction.

In some examples, measuring engine 120 may determine an end of beginning booting instructions when there have been a threshold number of instructions that are read by processing resource 110. In some examples, measuring engine 120 may determine that an end of beginning booting instructions when a threshold memory size of machine-readable storage medium has been accessed by processing resource 110. For example, machine-readable storage medium 101 may be carved up into different regions, with one region being dedicated to beginning booting instructions 102. Beginning booting instructions 102 may have a total number of instructions that are stored in a certain size of addressable memory space (e.g., 32 KB, 128 KB, etc.). Measuring engine 120 may accordingly determine an end of beginning booting instructions after processing resource 110 has accessed the threshold size (e.g., 32 KB, 128 KB, etc.)

Thus, in some examples, in a computing device that is booted in an expected manner, the processing resource 110 may access and execute the entirety of beginning booting instructions 102. Measurement engine 120 may duplicate each individual instruction in beginning booting instructions, generate an integrity value for each individual instruction, store the generated integrity value, and update the stored integrity value with a new integrity value for a subsequent instruction. In this manner, a "running" integrity value is kept. The ending integrity value stored in the measurement register 130 will reflect the entirety of beginning booting instructions 102 that is executed by processing resource. Additionally, the measured ending integrity value matches an expected integrity value for the beginning booting instructions. Accordingly, a verifying computing device (not shown in FIG. 1) may read the measured ending integrity value and determine that computing device 100 booted in an expected manner.

However, in some examples, beginning booting instructions 102 may be corrupt and modified by an attacker. In these examples, the ending integrity value will not match an expected integrity value even in the event processing resource 110 processes the entirety of beginning booting instructions 102. Additionally, in some examples, beginning booting instructions 102 may not be corrupt, but processing resource 110 is malfunctioning and executes the beginning booting instructions 102 in an unexpected manner. In these examples, the ending integrity value stored in measurement register 130 will not match an expected integrity value.

Accordingly, a verifying computing device (not shown) may determine that computing device 100 did not boot in the expected manner. In some examples, computing device 100 may include a memory to store the expected integrity value of the IBL. The expected integrity value may then be compared to the measured integrity value (e.g., by the measuring engine 120) to determine that computing device 100 did not boot in the expected manner. The memory region storing the expected integrity value may also be inaccessible to processing resource 110. The determination of the measuring engine 120 may be stored by measuring engine 120 for later transfer to another computing device. Thus, accordingly, measuring engine 120 may include hardware-based logic components to perform the validation.

As discussed above, measuring engine 120 includes hardware-based logic components. This allows the measuring engine 120 to access beginning booting instructions 102 executed by processing resource 110, to duplicate those beginning booting instructions 102, and to generate integrity values associated with the beginning booting instructions without interrupting the processing cycle of processing resource 110.

Additionally, the hardware-based logic components allow measurement engine 120 to be operationally screened from processing resource 110. As understood herein, "operationally screened" includes at least that the functions of measuring engine 120 (e.g., duplication of the instructions, generation of the integrity value associated with the instructions, incrementing the count value, etc.) are unable to be directly affected by processing resource 110. For example, "operationally screened" may mean that processing resource 110 may not send a signal to measuring engine 120 to affect or alter what measuring engine 120 does or the data that is generated by measuring engine 120. In some examples, "operationally screened" may also include that processing resource 110 is unaware of the functions of measuring engine 120. In some examples, measuring engine may also be undetectable by processing resource 110 (i.e., processing resource 110 is unaware of the existence of measuring engine 120).

Thus, in some examples, and in the example shown in FIG. 1, both measuring engine 120 and measurement register 130 are, to a certain extent, functionally independent from and unalterable by processing resource 110 while processing resource 110 processes beginning booting instructions 102. This is represented by dotted line 103. This allows measuring engine 120 and measurement register 130 to be trusted by a verifying computing device (e.g., a host computing device or a master computing device, etc.). The verifying computing device may evaluate the integrity value generated by measuring engine 120 and stored in measurement register 130.

Figure 3:
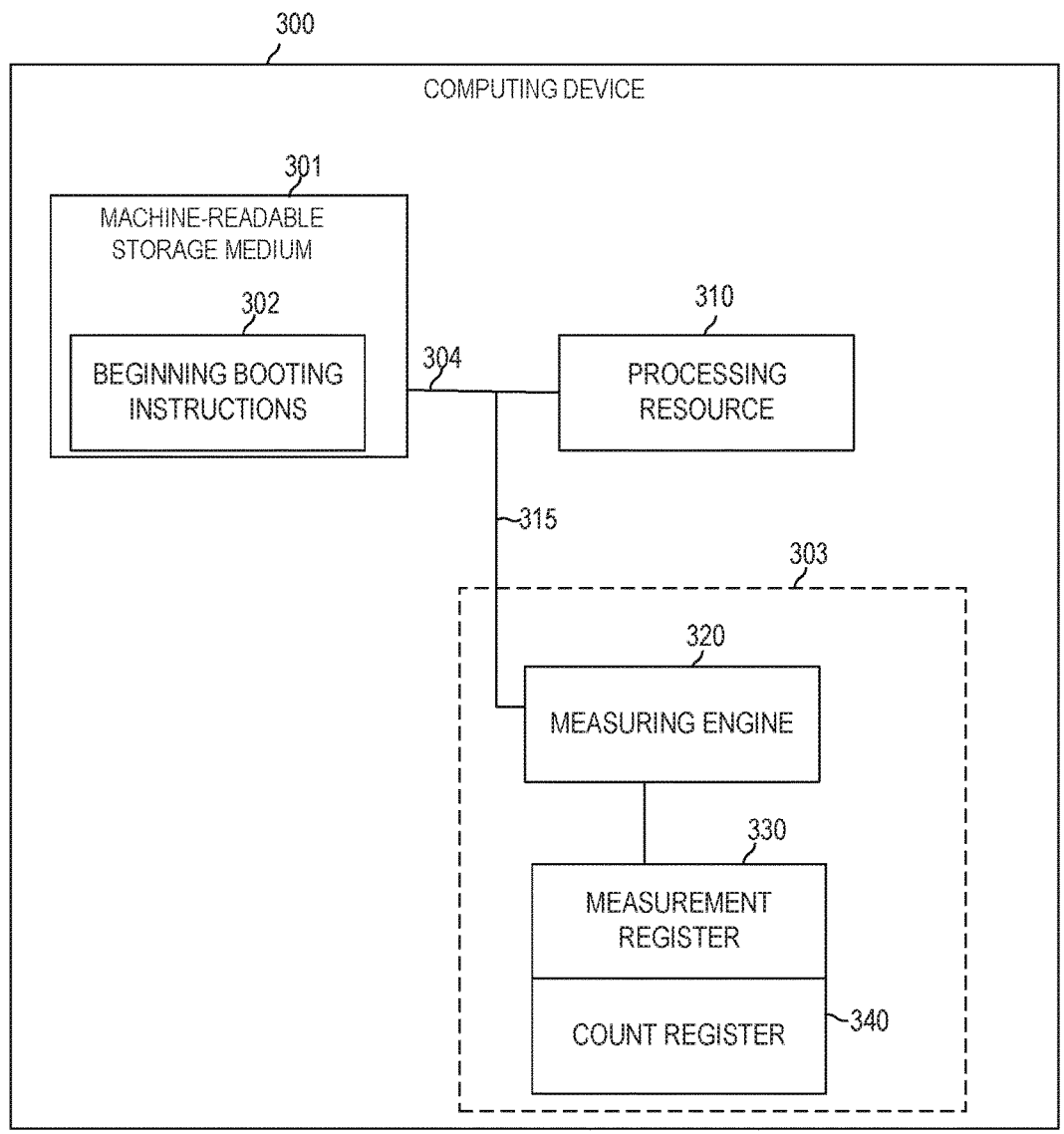
FIG. 3 is a block diagram of a computing device with a count register, according to some examples.
Figure 4:
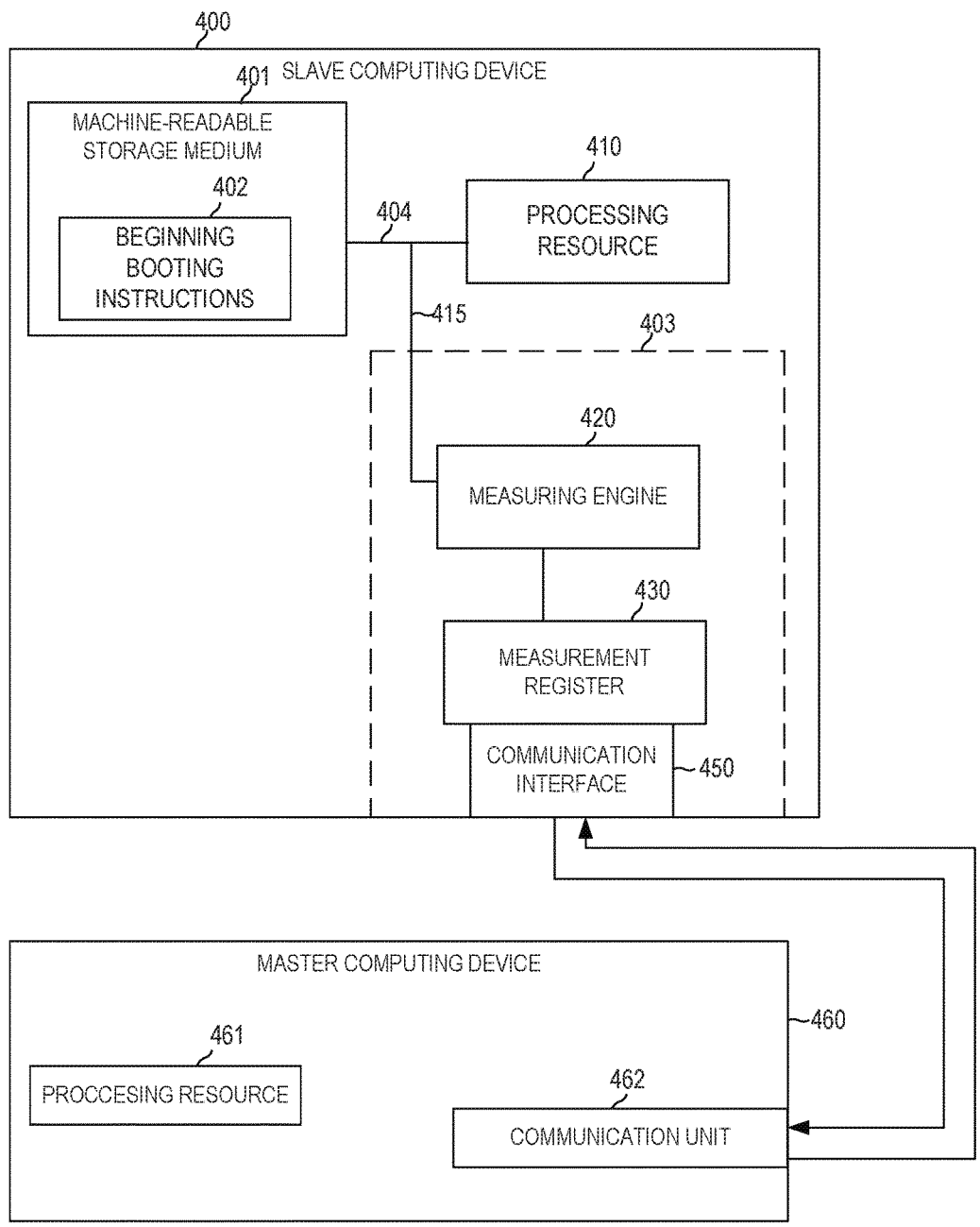
FIG. 4 is a block diagram of a slave computing device with a communication interface controlled by a master computing device, according to some examples.

Computing device 100 of FIG. 1 may include structural or functional aspects of computing device 200 of FIG. 2, computing device 300 of FIG. 3, or computing device 400 of FIG. 4.

FIG. 2 is a block diagram of a computing device 200 to generate an integrity value of beginning booting instructions. Similar to computing device 100, computing device 200 may be a server (e.g. a blade server), computer networking device (e.g., a switch), chip set, desktop computer, workstation, personal device, point of sale (PoS) device, etc., or any other processing device or equipment.

Computing device 200 includes a processing resource 210 and machine-readable storage medium 201. Machine-readable storage medium 201 is similar to machine readable storage medium 101. Beginning booting instructions 202 may be stored (encoded) on machine-readable storage medium 201 and is similar to beginning booting instructions 102.

Processing resource 210 includes memory 211, control unit 212, and arithmetic logic unit (ALU) 213. Memory 211 may be implemented by a main memory, such as Random Access Memory, where instructions (e.g. software) may reside during runtime. Memory 211 may store instructions, such instructions in beginning booting instructions 102, before they are executed. In some examples, control unit 212 may fetch the instructions from memory 211, and decode the instructions (i.e., interpret the instructions between operator, operand(s), etc.). In some examples, ALU 213 may then execute the instructions. Thus, for example, a first booting instruction of beginning booting instructions 202 may be loaded into memory 211. Control unit 212 fetches the first booting instruction, decodes the first booting instruction, and the ALU executes the first booting instruction.

Like computing device 100, computing device 200 also includes access line 215, measuring engine 220, and measurement register 230. Measuring engine 220 and measurement register 230 are similar to measuring engine 120 and measurement register 130, respectively. Access line 215 is similar to access line 115 of FIG. 1, except that access line 215 accesses the control unit 212 of processing resource 210, instead of an input and output lane 104.

In some examples, access line 215 may allow measuring engine 220 to access the instructions during the control unit 212's fetching of first booting instruction of beginning booting instructions 202 from memory 211. Accordingly, measuring engine 220 may duplicate the first booting instruction at the fetch stage of the control unit 212. Thus, as compared to examples described in FIG. 1, which accesses the instructions at an input to the processing resource, examples described in relation to FIG. 2 accesses the instructions at a point of processing that is internal to the processing resource.

However, like the examples described in relation to FIG. 1, the duplication by measuring engine 220 of the fetched instructions are also done without interruption to the processing cycle of processing resource 210. Additionally, in some examples, measuring engine 220 is operationally screened from processing resource 210. In some examples, measurement register 230 is inaccessible to processing resource 210. Thus, as represented by dotted line 203, measuring engine 220 and measurement register 230 may be functionally independent from and unalterable by processing resource 210.

Computing device 200 may also include a communication interface 250. Communication interface 250 may include a combination of hardware and software that allows computing device 200 to communicate with a verifying computing device 260 and to send the integrity value stored in measurement register 230 to verifying computing device 260. In some examples, communication interface 250 may be controlled by verifying computing device 260, as discussed in relation to communication interface 450 in FIG. 4. In some examples, communication interface 250 may include a serial bus, a parallel bus, etc.

Computing device 200 of FIG. 2 may include structural or functional aspects of computing device 300 of FIG. 3, or computing device 400 of FIG. 4. For example, computing device 200 may include a count register, as is described in relation to FIG. 3

FIG. 3 is a block diagram of computing device 300 with a count register. Computing device 300 includes a processing resource 310, machine readable storage medium 301, input and output lane 304, measuring engine 320, and measurement register 330. These components are similar to the components discussed in relation to FIG. 1 and will not be repeated here. In addition to these components, computing device 300 may also include a count register 340.

As discussed above, measuring engine 320 may generate an integrity value associated with an instruction of the beginning booting instructions. As also discussed above, measuring engine 320 may generate a first integrity value associated with a first booting instruction that is executed by processing resource 320. The first integrity value may be stored in measurement register.

As also described above, the measuring engine 320 may generate a second integrity value associated with a second booting instruction that is executed by processing resource 320. The first integrity value may be updated with the second integrity value in the measurement register. Thus, measuring engine 320 may generate an X number of integrity values for an X number of instructions in the beginning booting instructions.

Count register 340 is a storage medium of computing device 300 that allows computing device 300 to temporarily store the number of times an integrity value has been generated by measuring engine 320. In some examples, count register 340 may be implemented by an ASIC as described above in relation to measuring engine 120.

As discussed above, this number may reflect the number of individual instructions in the beginning booting instructions 302 that is read by processing resource 320. In some examples, this number may correlate to a total execution time it takes for processing resource to execute the instructions in beginning booting instructions that are accessed by processing resource 310. This is because the processing resource 310 may have a certain rate of execution. In some examples, the number stored by the count register may provide an extra security measure for a verifying computing device as it represents the number of instructions executed by processing resource 310 during the booting process.

In some examples, count register 340 is also inaccessible to processing resource 310, as similar to measurement register 330. Accordingly, in some examples, processing resource 310 cannot write to the count register 340 but can read the count register 340. In other examples, processing resource 310 cannot write to the count register 340 and additionally cannot read what is stored on the count register 340. As discussed above, computing device 100 may include additional processing resources other than processing resource 110. Additionally, computing device 100 may include other hardware-based logic components that process signals and data. In those examples, count register 340 may be inaccessible to those additional hardware-based logic components and processing resources. The inaccessibility of processing resource 310 (and/or additional processing resources or hardware-based logic components) to access count register 340 may allow reliance on the number value stored on the count register 340 as a value that has not been corrupted since creation.

Computing device 300 of FIG. 3 may include structural or functional aspects of computing device 100 of FIG. 1, computing device 200 of FIG. 2, or computing device 400 of FIG. 4.

FIG. 4 is a block diagram of a slave computing device 400 with a communication interface controlled by a master computing device. As understood herein, a "slave" computing device is a computing device that is part of or installed on another larger system, where the larger system has its own processing resource. In some examples, a slave computing device may be a bladed server. In some examples, slave computing device may be a networking switch. In the examples described in relation to FIG. 4, master computing device 460 may represent the larger system of which slave computing device 400 is part of. Master computing device 460 includes a processing resource 461, a communication unit 462, and a communication interface 463. Master computing device 460 may include additional components that are not shown in FIG. 4. For example, master computing device 460 may include a measurement register to store the integrity values received through communication interface 450.

Computing device 400 includes machine-readable storage medium 401, beginning booting instructions 402, input and output lane 404, processing resource 410, access line 415, measuring engine 420, and measurement register 430. These components are similar to similarly numbered components in FIG. 1 (e.g., 401 being similarly numbered to 101 in FIG. 1, etc.) and will not be discussed here.

Slave computing device 400 additionally includes a communication interface 450 that allows master computing device 460 direct access to measurement register 430. In some examples, communication interface 450 may include hardware-based logic components allowing direct access to measurement register 430. In some examples, communication interface 450 is a dedicated hardware communication channel. In some examples, communication interface 450 includes a serial bus. In other examples, communication interface 450 includes a parallel bus.

In some examples, communication interface 450 is controlled by master computing device 460. For example, master computing device 460 may have a communication unit 462. Communication unit 462 is a unit of master computing device 460 that includes a combination of hardware and software that allows master computing device 460 to manage communication interface 450. In some examples, communication unit 462 may provide configuration or management functions through communication interface 450 to read measurement register 450.

Accordingly, one way to characterize the communication interface 450 is that it is "out-of-band" of the processing stream of processing resource 410. Accordingly, the communication interface 450 is independent or unalterable by processing resource 410 because the measurement register 430 may be read by master computing device 460 without the knowledge or involvement of processing resource 410. This is represented by dotted line 403 in FIG. 4.

Additionally, in examples where the slave computing device and master computing device are utilized in networking, another way to characterize communication interface 450 is that it is "out-of-band" of the networking channels and may be managed without the establishment of the network. For example, Ethernet packets are not sent through communication interface 450 and the integrity value stored in measurement register 430 is sent directly to the master computing device through communication interface 450.

While FIG. 4 describes the use of a communication interface that is controlled by the master computing device 460 to link the measuring engine to the master computing device and send the integrity value, in other examples, a communication interface that involves processing resource of slave computing device may also be used. In these examples, the processing resource of the slave computing device is not trusted. Thus, in these examples, measuring engine may also include additional hardware-based logic components that allow measuring engine to have a private key that is inaccessible to processing resource of slave computing device. Additionally, in these examples, additional hardware-based logic components may allow measuring engine to use an asymmetric function. Thus, in this manner, the communication between the measuring engine and a master computing device (even with the involvement of processing resource of slave computing device) may be encrypted.

Computing device 400 of FIG. 4 may include structural or functional aspects of computing device 100 of FIG. 1, computing device 200 of FIG. 2, or computing device 300 of FIG. 3. For example, computing device 400 may include a count register, similar to count register 340 as described in FIG. 3. In those examples, the count register would also be accessed through communication interface 450 that is controlled by the master computing device, as described above. In examples where the communication interface involves the processing resource of the slave computing device (and not controlled by master computing device), the count register may be protected against modification by the processing resource of the slave computing device. In some examples, processing resource 410 cannot write to the count register but can read the count register. In some examples, count register may include hardware-based logic components that prevent the slave computing device from tampering with the count register (e.g., using a private key that is inaccessible to the processing resource of the slave computing device).

Figure 5:
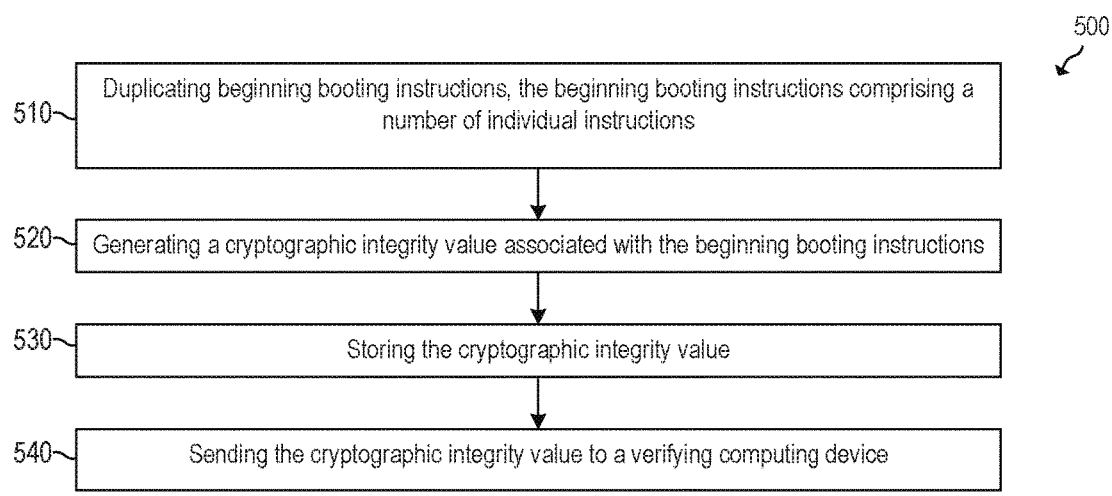
FIG. 5 is a flowchart of a method of generating an integrity value of beginning booting instructions, according to some examples.

FIG. 5 illustrates a flowchart for a method 500 to generate an integrity value of beginning booting instructions. Although execution of method 500 is described below with reference to computing device 200 of FIG. 2, other suitable systems for execution of method 500 may be utilized (e.g., computing device 100, computing device 300, computing device 400). Additionally, implementation of method 500 is not limited to such examples and it is appreciated that method 500 may be used for any suitable devices or system described herein or otherwise.

At 510 of method 500, measuring engine 220 duplicates beginning booting instructions 202 through access line 215. As discussed above, in some examples, the beginning booting instructions 202 may comprise a number of individual instructions. At 520 of method 500, measuring engine 220 generates a cryptographic integrity value associated with the beginning booting instructions 202. At 530 of method 500, measurement register 230 stores the cryptographic integrity value generated by measuring engine 220. At 540 of method 500, the cryptographic integrity value is sent to verifying computing device 260 through communication interface 250. In some examples, communication interface 250 is controlled by verifying computing device 260.

Although the flowchart of FIG. 5 shows a specific order of performance of certain functionalities, method 500 is not limited to that order. For example, some of the functionalities shown in succession may be performed in a different order, may be executed concurrently or with partial concurrence, or a combination thereof. For example, 510 and 520 may be executed with partial concurrence.

Figure 6:
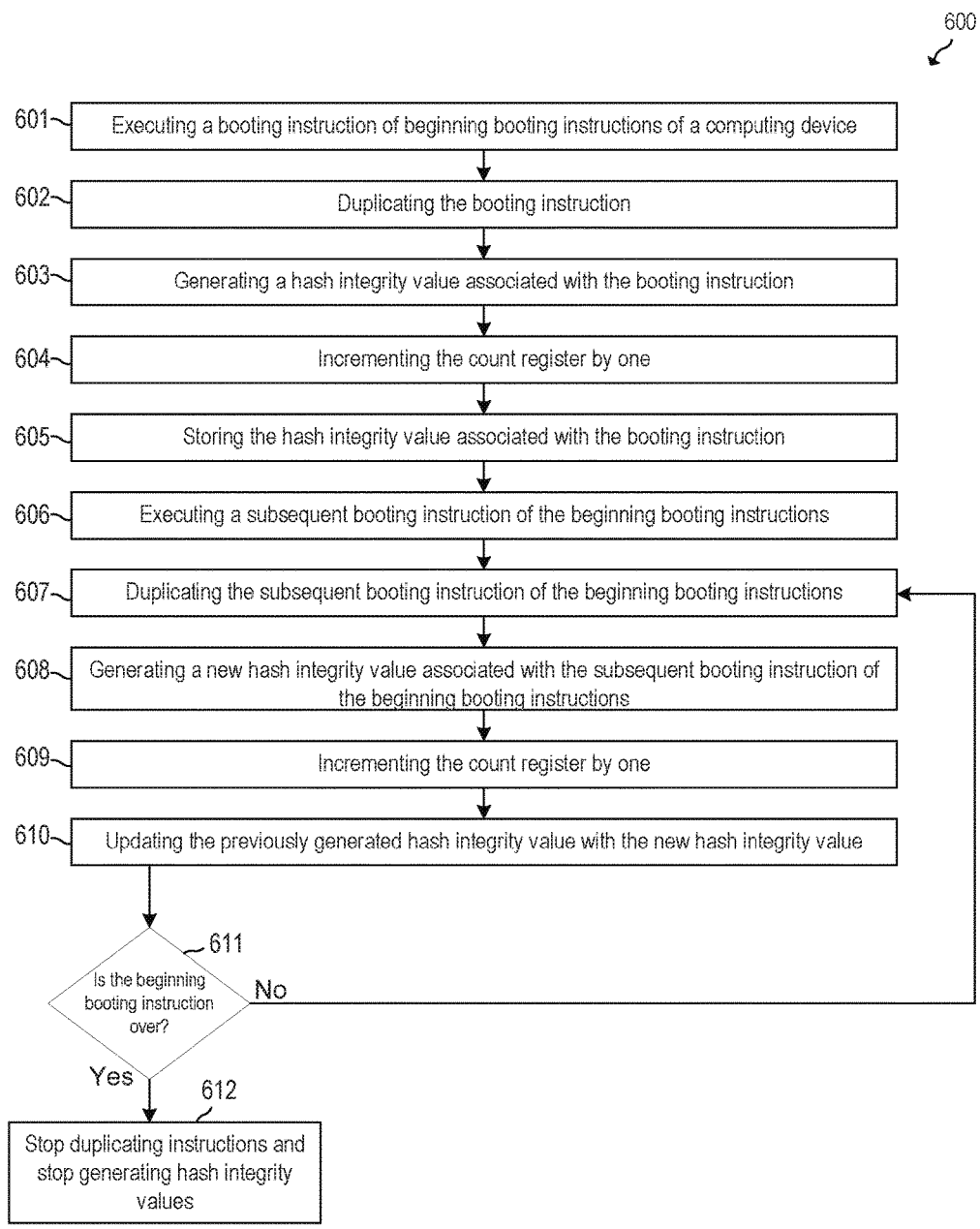
FIG. 6 is a flowchart of a method of updating an integrity value to reflect a subsequent booting instruction of beginning booting instructions, according to some examples.

FIG. 6 illustrates a flowchart for a method 600 to update an integrity value. Although execution of method 600 is described below with reference to computing device 400 of FIG. 4, other suitable systems for execution of method 600 may be utilized (e.g., computing device 100, computing device 200, computing device 300). Additionally, implementation of method 600 is not limited to such examples and it is appreciated that method 600 may be used for any suitable devices or system described herein or otherwise.

At 601 of method 600, processing resource 410 may execute a booting instruction of beginning booting instructions 402 stored on machine-readable storage medium 401 (e.g., a first booting instruction of beginning booting instructions). At 602 of method 600, measuring engine 420 duplicates the booting instruction through access line 415. At 603 of method 600, measuring engine 420 generates a hash integrity value associated with the booting instruction. At 604 of method 600, measuring engine 420 increments the count register 440 by one. This reflects that measuring engine 420 (and thus processing resource 410) has seen one instruction of the beginning booting instructions.

At 605 of method 600, measurement register 430 stores the first hash integrity value generated by measuring engine 420. At 606 of method 600, processing resource 410 may execute a subsequent booting instruction of the beginning booting instructions 402 stored on machine-readable storage medium 401 (e.g., a second booting instruction). At 607 of method 600, measuring engine 420 accesses the subsequent booting instruction through line 415 and duplicates the subsequent booting instruction. At 608 of method 600, measurement engine 420 generates a new hash integrity value associated with the subsequent booting instruction. At 609 of method 600, measurement engine 420 increments the count register 440 by one. Thus, the value now stored in count register 440 may be two.

At 610 of method 600, measurement engine 420 updates the hash integrity value associated with the booting instruction (generated at 603 and stored at 605) with the new hash integrity value associated with the subsequent booting instruction (generated at 608) by storing the new hash integrity value in the measurement register 430. This may be done as described above, in relation to FIG. 1.

At 611 of method 600, measurement engine 420 determines an end of beginning booting instruction. This determination may be done as described above in relation to FIG. 1.

Responsive to there being a determination that the beginning booting instruction 402 is not at an end, method 600 iterates back to 607 to duplicate a subsequent instruction that is accessed by processing resource 410. Thus, while processing resource 410 may continue to access a subsequent booting instruction, processing resource 410 is not accessing the subsequent booting instruction responsive to the determination at 611 by measurement engine 420. Rather, processing resource 410 is accessing the subsequent booting instruction due to a processing cycle of processing resource 410. Accordingly, the processing cycle of processing resource 410 is not interrupted by the determinations of measuring engine 420.

Responsive to there being a determination that the beginning booting instruction is at an end, method 600 moves to 612. At 612 of method 600, measuring engine 420 stops duplicating instructions in input and output lane 405 and stops generating hash integrity values.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A computing device comprising:
   a processing resource to execute beginning booting instructions of the computing device, wherein the beginning booting instructions comprises a first booting instruction and a second booting instruction;
   an access line to access the first booting instruction;
   a measuring engine to duplicate the first booting instruction and to generate a first integrity value associated with the first booting instruction, wherein the measuring engine is operationally screened from the processing resource and comprised of hardware-based logic components; and
   a measurement register to store the first integrity value, wherein the measurement register is inaccessible to the processing resource; and
      wherein the measuring engine is to duplicate the second booting instruction, to generate a second integrity value associated with the second booting instruction, and to update the first integrity value with the second integrity value.

2. The computing device of claim 1, comprising a count register to store a value to represent a number of times the measuring engine generates an integrity value.

3. The computing device of claim 1, wherein the measuring engine is to determine an end of the beginning booting instructions.

4. The computing device of claim 3, comprising a communication interface to link the measurement register directly to a host computing device, wherein the communication interface is controlled by the host computing device.

5. The computing device of claim 4, wherein the communication interface comprises a serial bus.

6. The computing device of claim 1, comprising an input and output lane connected to the processing resource, wherein the access line is connected to the input and output lane.

7. The computing device of claim 1, wherein the processing resource comprises a control unit to fetch the first booting instruction from a memory, and wherein the access line is connected to the control unit to access the fetched instruction.

8. A method comprising:
   duplicating, with a hardware-based measuring logic component, beginning booting instructions of a computing device, wherein the beginning booting instructions comprise a number of individual instructions;
   storing in a count register, a value associated with the number of individual instructions;
   generating, with the hardware-based measuring logic component, a cryptographic integrity value associated with the beginning booting instructions;
   storing, in a measurement register, the cryptographic integrity value; and
   sending, over a communication interface, the cryptographic integrity value to a verifying computing device.

9. The method of claim 8, comprising executing, with a processing resource of the computing device, the beginning booting instructions.

10. The method of claim 9, wherein the hardware-based measuring logic component is undetectable by the processing resource of the computing device.

11. The method of claim 8, comprising:
   receiving the cryptographic integrity value at the verifying computing device; and
   evaluating the cryptographic integrity value at the verifying computing device;
      wherein the sending of cryptographic integrity value is direct to the verifying computing device; and
      wherein the communication interface is controlled by the verifying computing device.

12. A slave computing device comprising:
- a processing resource to execute beginning booting instructions of the slave computing device, wherein the beginning booting instructions comprises a number of individual instructions;
- an access line to access the beginning booting instructions;
- a measuring engine to duplicate the beginning booting instructions and to generate a cryptographic integrity value associated with the beginning booting instructions, wherein the measuring engine is operationally screened from the processing resource;
- a measurement register to store the cryptographic integrity value;
- a count register to store a value associated with the number of individual instructions; and
- a communication interface to link the measurement register directly to a master computing device, wherein the communication interface is controlled by the master computing device.

13. The computing device of claim 12, wherein the measuring engine is comprised of hardware-based logic components.

14. The computing device of claim 12, comprising an input and output lane connected to the processing resource, wherein the access line is connected to the input and output lane.

15. The computing device of claim 12, wherein the processing resource comprises a control unit to fetch the beginning booting instructions from a memory, and wherein the access line is connected to the control unit to access the fetched instructions.

16. The computing device of claim 12, wherein the communication interface comprises a serial bus.

* * * * *